E. N. HATCHER.
VEHICLE WHEEL RIM.
APPLICATION FILED FEB. 24, 1917.
1,236,301.
Patented Aug. 7, 1917.
2 SHEETS—SHEET 2.
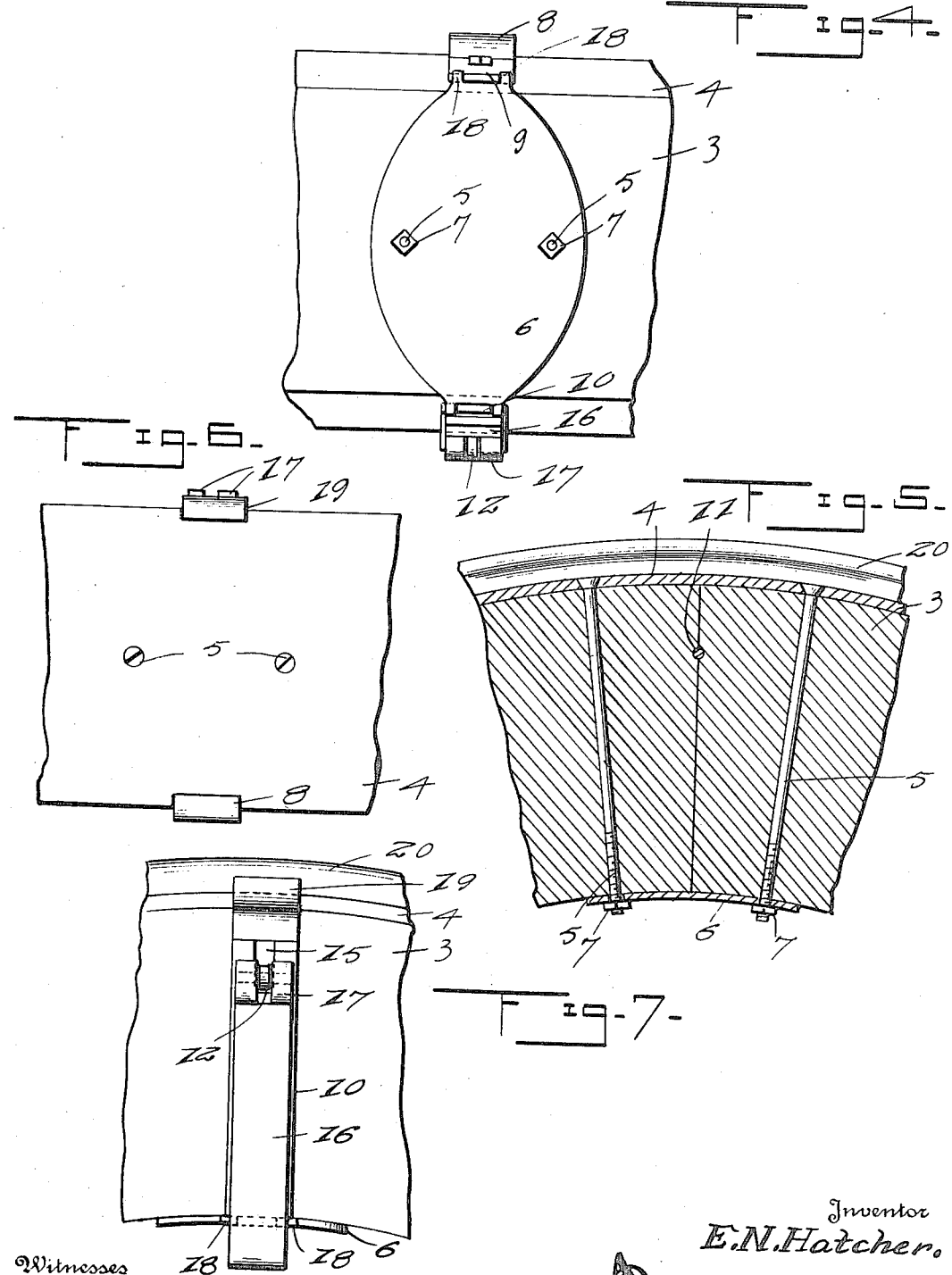

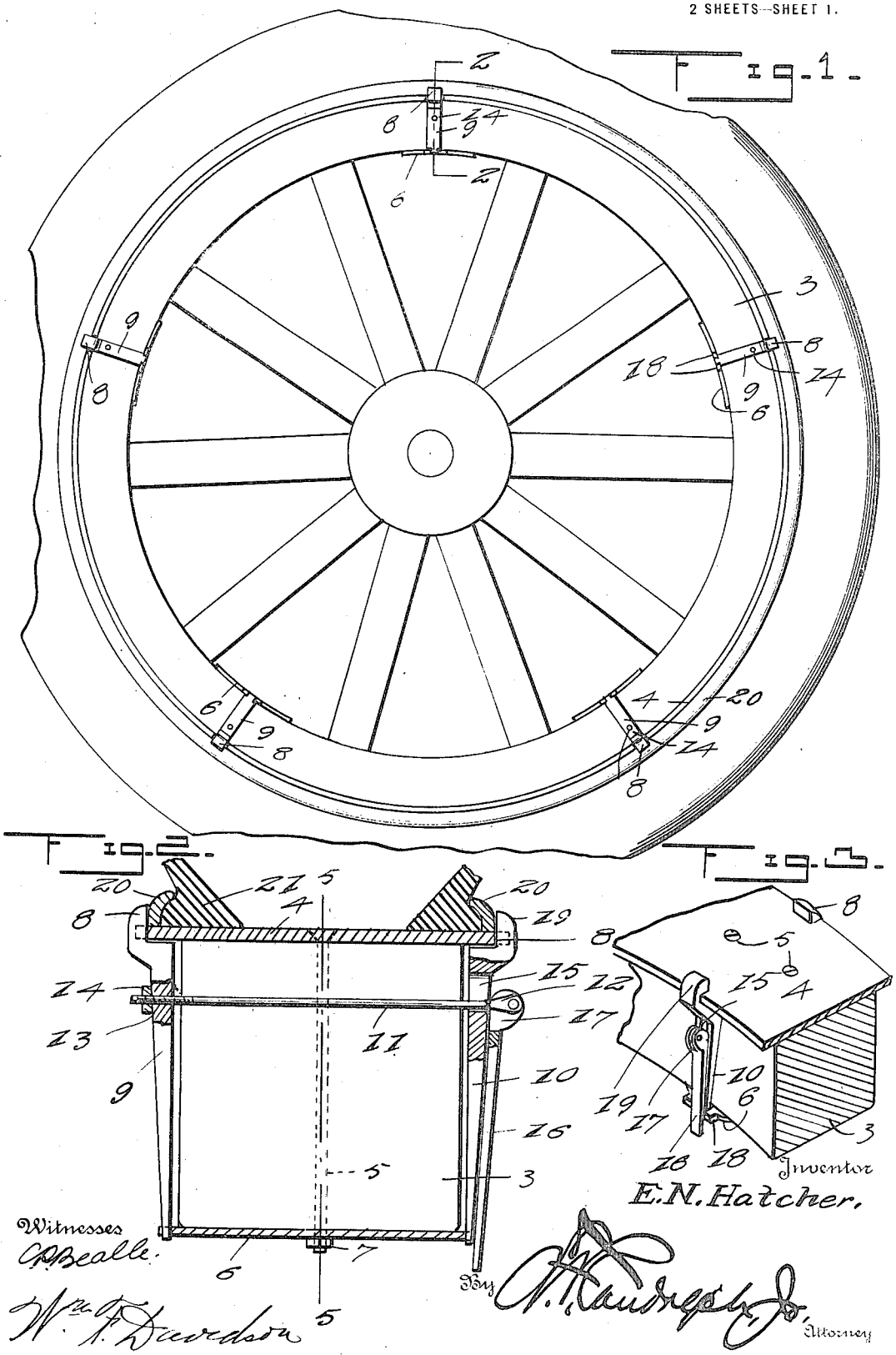

UNITED STATES PATENT OFFICE.

ELDER N. HATCHER, OF EAST TALLASSEE, ALABAMA.

VEHICLE-WHEEL RIM.

1,236,301.  Specification of Letters Patent.  Patented Aug. 7, 1917.

Application filed February 24, 1917. Serial No. 150,692.

*To all whom it may concern:*

Be it known that I, ELDER N. HATCHER, a citizen of the United States, residing at East Tallassee, in the county of Tallapoosa and State of Alabama, have invented certain new and useful Improvements in Vehicle-Wheel Rims; and I do hereby declare the following to be a full, clear, and exact description of the invention, such as will enable others skilled in the art to which it appertains to make and use the same.

This invention relates to a vehicle wheel rim and has for one of its objects the provision of a device of this character, whereby a resilient tire may be readily applied or removed from a felly of a wheel, without the use of tools which are especially constructed for the purpose.

Another object of this invention is to provide means for detachably securing the side rings that secure the tire to the felly of the wheel, whereby the tire may be removed when desired.

A further object of this invention is to provide locking members adapted to be moved into and out of engagement with the side rings for permitting the tire to be applied and removed from the felly of the wheel.

A further object of this invention is to provide locking levers for holding the locking members in engagement with the tire to prevent the tire from becoming detached from the felly.

A further object of this invention is to provide inner plates having relatively spaced lugs for engaging the inner ends of the locking members for preventing them from relative movement in respect to the felly when in operative position, or held in engagement with the side rings by the locking levers.

A still further object of this invention is the provision of a vehicle wheel rim of the above stated character, which shall be simple, durable and efficient, and which may be manufactured and sold at a comparatively low cost.

With these and other objects in view as will become more apparent as the description proceeds, the invention consists of certain novel features of construction, combination and arrangement of parts, as will be hereinafter more fully described and claimed.

In the drawings:

Figure 1 is a plan view of a vehicle wheel rim constructed in accordance with my invention, Fig. 2 is a sectional view taken on the line 2—2 of Fig. 1, Fig. 3 is a fragmentary perspective view illustrating the means for securing the tire to the felly, Fig. 4 is a fragmentary bottom plan view illustrating the plates for holding the inner ends of the locking levers, Fig. 5 is a fragmentary sectional view taken on the line 5—5 of Fig. 2, Fig. 6 is a fragmentary plan view illustrating the rim and the upper ends of the locking members, Fig. 7 is a fragmentary side elevation illustrating one of the locking members and the locking levers thereto.

Referring in detail to the drawings, the numeral 1 indicates the hub of a wheel having the usual radial spokes 2, to which is secured the felly 3. The felly 3 is constructed in the usual manner from wood or other like material and from a single length of material, having its ends abutting each other as illustrated in Fig. 5. A rim 4 is positioned circumferentially about the outer face of the felly 3 and is provided with a plurality of apertures to receive bolts 5, which extend through the felly and have their inner ends disposed through apertures in plates 6. The bolts 5 have nuts 7 threaded thereon which prevent the withdrawal of the bolts 5 from the felly, rim and plates. The plates 6 coöperate with the rim 4 in securing the adjoining or abutting ends of the felly together, as illustrated in Fig. 5.

The rim 4 is of greater width than the felly 3 so that the edges of the rim 4 project beyond the side faces or edges of the felly 3 as illustrated in Fig. 2. The edges or side faces of the rim 4 are provided with a plurality of oppositely disposed notches 8, which are adapted to receive the outer ends of locking members 9 and 10. The locking members 9 and 10 are arranged upon the felly 3 in such a manner that the locking members 9 will be disposed upon one side of the felly, while the locking members 10 are disposed upon the opposite side of the felly. Bolts 11 extend transversely through the felly 3 and have one of their ends bifurcated as illustrated at 12 while their opposite ends are screwthreaded as illustrated at 13 to receive nuts 14. The locking members 9 are provided with apertures to receive the screwthreaded ends of the bolts 11, whereby upon threading the nut 14 upon the threaded end 13 of the bolt, the locking members 9 will be held to the felly 3. The bifurcated ends 12 of the bolts 11 extend through elongated slots 15 formed in the locking members 10 and have pivoted thereto, eccentric locking levers 16 which are provided with the usual cams 17, whereby upon swinging downwardly, the locking levers, the locking members 9 and 10 will be drawn in the direction of each other, or into engagement with the side faces of the felly 3. The lower ends of the locking members 9 and 10 are received between pairs of relatively spaced lugs 18 formed upon the plates 6, whereby the lower ends of the locking levers are held against relative movement in respect to the felly 3 when in operative position. The upper ends are provided with offset lugs 19 which extend through the slots 8 of the rim 4 and engage side rings 20 which are positioned upon the rim 4 for engagement with the beads of a tire 21. The rings 20 are so curved as to conform to the contour of the beads of the tire 21, as illustrated in Fig. 2, whereby upon swinging the locking levers 16, downwardly, the locking members 9 and 10 will cause the offset lugs 19 thereon to clamp the side rings 20 into engagement with the tire. The side rings 20 are so constructed that when positioned upon the rim 4 as illustrated in Fig. 2, they may be used for clamping the clencher type of tire and they may be reversed from the direction indicated in Fig. 2 to be used for clamping the usual straight tire that does not use the beads as illustrated in Fig. 2.

In operation, when the tire 21 becomes punctured or has a blowout, the locking levers 16 are swung upwardly releasing the tension upon the locking members 9 and 10 and as the locking members 10 are provided with the elongated slots, they are permitted to move downwardly out of engagement with the side ring 20, which is disposed upon the respective side with the locking members 10, thus permitting the side ring to be removed from the rim 4 whence the tire 21 may be readily removed from the rim. After the blowout or puncture has been repaired, the tire 21 is placed upon the rim 4 and the ring 20, which has been removed is placed upon the rim 4 in engagement with the beads of the tire and by pushing upwardly upon the locking members 10 until the offset lugs 19 engage the rim 4, the locking levers 16 are swung downwardly into engagement with the locking members 10, thus tightly clamping the tire 21 upon the rim 4. When the tire 21 is inflated in the usual manner, the pressure against the rings 20 which bear against the locking members 9 and 10 is of such a great degree, that it is impossible for the locking levers to be accidentally swung upwardly to free the tire, thus overcoming the danger of the tire from becoming detached from the rim 4, while in use, as is necessary before the tire can be removed from the rim 4 to become deflated, relieving the pressure upon the rings 20 and the locking members 9 and 10.

The nuts 14 being threaded to the bolts 11 provide an adjustment to the locking members 9 and 10, whereby the tension thereof upon the rings 20 may be increased and decreased as desired.

While I have shown and described the preferred embodiment of my invention, it will be understood that minor changes in construction, combination and arrangement of parts may be made without departing from the spirit and scope of the invention as claimed.

What is claimed is:

1. A vehicle wheel comprising a felly, a rim surrounding the felly and projecting beyond the side faces thereof and having oppositely disposed notches, side rings carried by the rim for engagement with a tire, bolts extending transversely of the rim, locking members carried by said bolts, offset lugs formed upon the outer ends of the locking members and extending through the slots in the rim and in engagement with the side rings, means connected to the bolts for moving the locking members in the direction of each other to cause the side rings to clamp the tire upon the rim, inner plates secured to the felly, oppositely disposed and relatively spaced lugs formed upon the plates for receiving the lower ends of the locking members to hold them against relative movement with respect to the felly when in operative position.

2. A vehicle wheel comprising a felly, a rim surrounding said felly, side rings carried by said rim for engagement with a tire, bolts extending transversely of the rim, locking members carried by said bolts, and having their outer ends in engagement with the side rings, some of said locking members having elongated slots to receive the bolts for permitting them to move in relation to the felly, and eccentric levers connected to the bolts for moving the locking members in the direction of each other to cause them to force the side rings into engagement with the tire.

In testimony whereof I affix my signature in presence of two witnesses.

ELDER N. HATCHER.

Witnesses:
C. L. MANN,
S. P. JOHNSON.